April 18, 1933.     C. B. HASKINS     1,904,451

BEARING

Filed May 16, 1930

Inventor
C. B. Haskins
By his Attorney
W. M. Wilson

Patented Apr. 18, 1933

1,904,451

UNITED STATES PATENT OFFICE

CLIFFORD B. HASKINS, OF DAYTON, OHIO, ASSIGNOR TO DAYTON SCALE COMPANY, OF DAYTON, OHIO, A CORPORATION OF NEW JERSEY

BEARING

Application filed May 16, 1930. Serial No. 452,943.

The present invention relates to weighing scales in general and particularly to the construction of bearings for supporting the pivot members of the scale.

The broad object of the present invention is to provide an improved bearing for the knife edges of the pivot members of the scale, the specific object being to provide a new and improved bearing which is self-aligning.

Another object is to reduce the cost of manufacturing such a bearing by simplifying the construction of the individual parts and reducing the cost of assembling the finished parts.

Other objects and advantages of the present invention will be pointed out or will be apparent from a study of the following specification and claim and of the accompanying drawing which, by way of illustration, shows what, at present, is considered a preferred embodiment of the invention.

Figure 1:
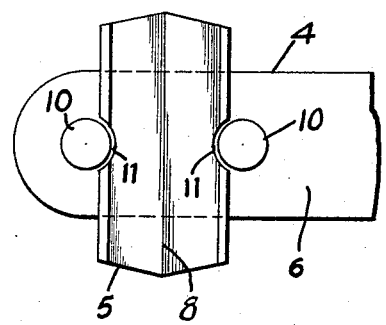
Figure 1 is a top plan view of a bearing embodying the present invention, showing the manner of attachment to the scale.
Figure 2:
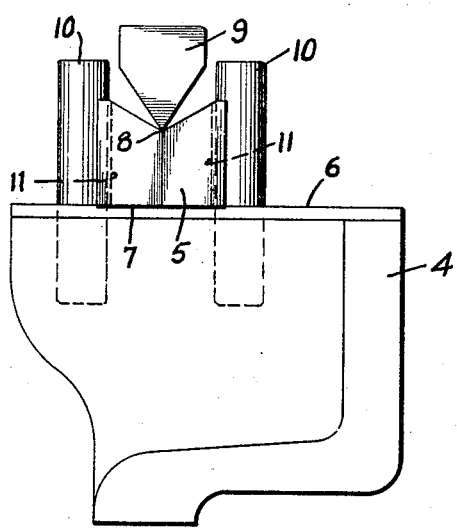
Figure 2 is a front elevation of the bearing.
Figure 3:
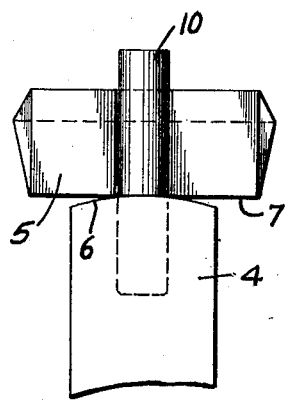
Figure 3 is a side elevation of the bearing.

The numeral 4 represents a portion of the scale frame which is adapted to support the bearing block 5. The frame 4 is preferably composed of a material which is relatively easy to machine, such as cast iron, and the upper edge thereof is formed with a curved surface 6 adapted to rockably support the bearing block 5, the object being to permit the bearing block to rock slightly in a direction transverse of the vertical plane of the frame 4.

The bearing block 5 is substantially flat in its under surface 7 and is provided with a V-shaped groove 8 adapted to support and provide a bearing surface for the knife edge 9. Mounted in spaced relationship in holes in the upper edge of the frame 4 are two hardened steel pins 10 which fit tightly in the holes, serving to guide the bearing block 5 and permit a certain amount of free rocking movement of the block in all directions, suitable grooves 11 formed in the block 5 cooperating with the pins 10 to permit such free movement. It will be observed that the radius of curvature of the grooves 11 is greater than the radius of curvature of the pins 10 thereby permitting a limited amount of free rocking movement.

The foregoing construction provides a very economical structure, which can be cheaply manufactured and assembled. The hardened steel pins 10 may be manufactured in quantity and ground accurately to size before forcing them into the holes in the frame 4 thereby permitting very accurate centering and clearances; furthermore, the pins may be readily replaced when worn.

The bearing block 5 may likewise be very cheaply manufactured with great accuracy and the clearances between the pins 10 and the bottoms of the grooves 11 kept within very close limits. It is both necessary and desirable that the clearance between the block 5 and the pins 10 be kept as small as possible in order not to impair the accuracy of the scale.

It will be clear that the construction herein described provides a simple and efficient scale bearing the parts of which are easily assembled or replaced when worn. The absence of screws in the assembled bearing is a decided advantage from the standpoint of cheapness of construction and ease of assembly or replacement of worn parts. It is plain that the only operation required to assemble the bearing is to press the pins 10 into their holes, an operation which can be performed rapidly and with unskilled labor by means of an arbor press on the workman's bench.

The present invention, for sake of convenience in description and to assist in a clear understanding of the principles involved, has been shown and described in a specific embodiment. However, it is not the desire to limit the invention to the precise embodiment shown and described as it is capable of adaptations and variations, all within the scope of the following claim.

I claim:

In a scale, the combination of a bearing block adapted to support a scale pivot member, said bearing block being provided with grooves on opposite sides thereof and a flat surface extending transversely of said grooves, a support for said block provided with a curved surface upon which bears the flat surface of the block, and a plurality of guiding pins mounted in the latter and loosely co-acting with the grooves in the bearing block, said pins and the co-acting grooves being co-ordinated with the curved surface of the support to permit limited universal aligning movement of the block relative to the support.

In testimony whereof I hereto affix my signature.

CLIFFORD B. HASKINS.